US010274322B2

(12) United States Patent
Kim et al.

(10) Patent No.: US 10,274,322 B2
(45) Date of Patent: Apr. 30, 2019

(54) METHOD OF TRACING POSITION OF PIPELINE USING MAPPING PROBE

(71) Applicant: WATER RESOURCES ENGINEERING CORPORATION, Seongnam-si, Gyeonggi-do (KR)

(72) Inventors: Jin Won Kim, Seongnam-si (KR); Young Soo Seok, Hanam-si (KR); Kyung Sob Lee, Namyangju-si (KR); Se Wan Lee, Yongin-si (KR); Dong Hyun Kim, Yongin-si (KR); Kyung Seok Oh, Suwon-si (KR); Yong Gun Lee, Yongin-si (KR); Jung Hun Oh, Jinju-si (KR); Gwang Ho Jin, Seoul (KR); Ja Yong Koo, Seoul (KR); In Hwan Hyun, Seoul (KR)

(73) Assignee: WATER RESOURCES ENGINEERING CORPORATION, Seongnam-si, Gyeonggi-Do (KR)

( * ) Notice: Subject to any disclaimer, the term of this patent is extended or adjusted under 35 U.S.C. 154(b) by 531 days.

(21) Appl. No.: 14/929,370

(22) Filed: Nov. 1, 2015

(65) Prior Publication Data
US 2016/0282121 A1 Sep. 29, 2016

Related U.S. Application Data

(63) Continuation of application No. PCT/KR2015/003983, filed on Apr. 21, 2015.

(30) Foreign Application Priority Data

Mar. 27, 2015 (KR) .................. 10-2015-0043283

(51) Int. Cl.
*G01C 21/14* (2006.01)
*G01C 21/20* (2006.01)
*G01C 15/00* (2006.01)

(52) U.S. Cl.
CPC ............. *G01C 21/14* (2013.01); *G01C 15/00* (2013.01); *G01C 21/20* (2013.01)

(58) Field of Classification Search
CPC ......... G01C 21/14; G01C 21/20; G01C 15/00
(Continued)

(56) References Cited

U.S. PATENT DOCUMENTS 6,243,657 B1 * 6/2001 Tuck .................. G01N 29/2412
324/207.13
2007/0199383 A1 * 8/2007 Lander .................... F16L 55/32
73/661

(Continued)

FOREIGN PATENT DOCUMENTS

KR 10-2012-0133484 A 12/2012

*Primary Examiner* — Stephanie E Bloss
(74) *Attorney, Agent, or Firm* — LRK Patent Law Firm

(57) ABSTRACT

A method of tracing a position of a pipeline using a mapping probe includes: inserting and moving the mapping probe in a pipeline; receiving and keeping acceleration information and angular information in real time in a memory; estimating Euler angle (roll and pitch); estimating Euler angle (roll, pitch, and yaw); estimating a system modeling; estimating and applying covariance of system noise and covariance of measured noise; estimating three-dimensional position information modeling; receiving and keeping movement distance information of the mapping probe from an encoder in a memory; estimating and keeping in real time three-dimensional position information of the mapping probe in the memory; receiving the accumulated real-time three-dimensional position information of the mapping probe; mapping the accumulated real-time three-dimensional position information of the mapping probe to geographic information; and displaying the accumulated position information of the mapping probe mapped to the geographic information on a display unit.

8 Claims, 9 Drawing Sheets

(58) Field of Classification Search
USPC .......................................................... 702/153
See application file for complete search history.

(56) References Cited

U.S. PATENT DOCUMENTS

| | | | |
|---|---|---|---|
| 2010/0211354 A1* | 8/2010 | Park | G01V 8/12 |
| | | | 702/165 |
| 2012/0152025 A1* | 6/2012 | Chu | F16L 55/28 |
| | | | 73/714 |
| 2015/0254861 A1* | 9/2015 | Chornenky | G01C 15/00 |
| | | | 348/135 |
| 2016/0282122 A1* | 9/2016 | Kim | G01M 3/005 |

* cited by examiner

METHOD OF TRACING POSITION OF PIPELINE USING MAPPING PROBE

CROSS-REFERENCE TO RELATED APPLICATIONS

This application is a continuation of International Application No. PCT/KR2015/003983, filed Apr. 21, 2015, which claims priority to Korean Patent Application No. 2015-0043283, filed on Mar. 27, 2015, the disclosures of which are incorporated herein by reference in their entireties.

BACKGROUND OF THE INVENTION

1. Field of the Invention

The present invention relates to accurately finding the position of a pipeline using a mapping probe. In general, tap water pipelines and sewer pipelines are embedded under the ground and it is difficult to locate those pipelines visually or through a communication means. Accordingly, it is possible to locate the entire pipelines by putting a mapping probe into pipelines and finding real-time position information of a mapping probe.

2. Description of Related Art

As a related art of the present invention, there is Korean Patent Application Publication No. 10-2012-0133484. FIG. 1 is, a diagram showing, a system for putting and taking a mapping probe into and out of a pipeline of the related art and FIG. 2 is a flowchart, illustrating a process of moving a mapping probe through a pipeline. In FIG. 1, a system for putting and taking a mapping probe into and out of a pipeline of the related art includes a launcher 100-1 for putting, a mapping probe P, which collects various data for 3D mapping while moving along a pipeline (for example, a tap water pipeline under the ground), into a pipe line 1 and a receiver 200-1 for taking the mapping probe P out of the pipeline. In this configuration, first and second main valves 3 and 5 for respectively stopping and allowing water supply, are disposed at the start point and the end point of the pipeline in a mapping section. The launcher 100-1 includes a first checking section 110 and a stopper 150, in which the first checking section is disposed between the first main valve 3 and an end of a pipeline 1 to be mapped (hereafter, referred to as "object pipeline") which is the start point of a mapping section of the pipeline 1. The first checking section has an entrance hole having a predetermined diameter at the top through which the mapping probe P is put inside and the entrance hole is opened/closed by a door 130. The first checking section has a first pressure gauge 113 at aside and the first pressure gauge 113 can indirectly find the current position of the mapping probe P by finding out a pressure change in, the object pipeline 1 in cooperation with a second pressure gauge 217 in a body 210 of the receiver 200-1. The door 130 has an air discharge valve 131 that communicates with the first checking section, on the top, and an eye nut is coupled to the door 130 to easily open/close the door 130. The stopper 150 temporarily forcibly fixes the mapping probe P put in the first checking section through the entrance hole. The stopper 150 has a slide shaft disposed through the door 130 and a pressure bolt moving up/down the slide shaft. In this configuration, the pressure bolt is connected to a movable bolt to change the position. The stopper 150 includes a pressure member coupled to the lower end of the slide shaft and fixing a portion of the mapping probe P under pressure in the launcher. In this configuration, the pressure member is connected to the lower end of the slide shaft by a hinge H. The receiver 200-1 includes a body 210, a door 230, a pair of flow control ports, a rear discharge port 270, and a shock-absorbing unit 290. The body 210 communicates with an extension line 171 diverging from the second checking section 170 and has an extraction hole for taking the mapping probe P out of the body 210 at the top and a door 230 for opening/closing the extraction hole. The second pressure gauge 217 is disposed at a side of the body 210. In this configuration, a second main valve is disposed at a side of the second checking section 170, so it controls stopping/allowing of water supply in cooperation with the first main valve 3. An air discharge valve 231 that communicates with the body 210 is disposed on the top of the door 230 and an eye nut is coupled to the door 230 to easily open/close the door 230. A pair of flow control ports controls the speed of the mapping probe P moving in the object pipeline 1 by changing a flow speed by controlling discharge of water filled in the object pipeline 1. The pair of flow control ports has the same size and length and symmetrically diverge from the body 210 to both side of the, body 210. A valve and a flow meter for controlling discharge of water from the object pipeline 1 are disposed in each of the pair of flow control ports. A worker can maintain, a uniform flow rate in the object pipeline 1 even if mapping is performed several times, by checking a flow speed in the object pipeline 1 from the flow meter and controlling the flow speed. The rear discharge port 270 discharges the water in the body 210 so that the mapping probe P reaching the body 210 is guided into the body 210 and fully docked. In this configuration, the rear discharge port 270 has a valve 271 for controlling discharge of water. The shock-absorbing unit 290 prevents a rapid increase of the final hit value collected by the mapping probe P by stopping the mapping probe P docked in the body 210 and by absorbing shock power applied to the mapping probe P when it is stopped. The shock-absorbing unit 290 includes a hitting member and a plurality of arrival indication rods. The hitting member is disposed in the body 210 substantially at a height corresponding to the center of the front end of the mapping probe. The hitting member may be made of a material having predetermined elasticity. The arrival indication rods are disposed in the body 210 to elastically support the hitting member so that the hitting member is moved in parallel with the movement of the mapping probe P. In this configuration, a coil spring is disposed between the hitting, member and the arrival indication rod. Further, the arrival indication rods partially protrude out of the body 210, and they further protrude out of the body 210 when the mapping probe P hits against the shock-absorbing unit 290 after being docked in the body 210, so a worker can easily visually determine that the mapping probe P has reached the receiver 200-1.

In the process of moving a mapping probe through a pipeline, water supply is stopped by closing the first and second main valves 3 and 5 at both ends of the object pipeline 1 (S1). In this case, with the water supply stopped, water in the object pipeline 1 is naturally discharged, and accordingly a predetermined empty space is defined in the object pipeline 1. The mapping probe P is put inside through the first checking section of the launcher 100-1 and then the door is closed (S2). In this state, a portion of the mapping probe P is pressed by moving down the pressure member of the stopper 150 and accordingly the mapping probe P is forcibly fixed between the pressure member and the inner side of the first checking section (S3). Next, the pair of flow control ports of the receiver 200-1 at the mapping end point of the object pipeline 1 are opened (S4) and the closed first and second main valves 3 and 5 are closed, thereby filling the object pipeline with water (S5). When object the pipelines 1 is filled with water, the empty space in the object pipeline 1 is removed. After filling the object pipeline with water, flow rate is controlled by operating the pair of flow control ports (S6). Accordingly, desired pressure and flow speed in the object pipeline 1 are set. Next, the mapping probe P is released by opening the stopper 150 (S7). In this case, the mapping probe P collects mapping data while moving at a stable speed, that is, an optimal speed for collection of mapping data by the water flowing through the object pipeline 1. Thereafter, when the mapping probe P is fully enters the body 210 of the receiver 200-1, water supply to the object pipe 1 is stopped by closing the first and second, main valves 3 and 5 (S8). In this case, the shock-absorbing unit 290 minimizes shock when the mapping probe P is docked in the body 210, so the mapping probe P stably stops. Finally, the door of the receiver 210 is, opened and the mapping probe P is taken out of the body 210 (S9). As described above, by stabilizing flow rate and flow speed in the objective pipeline 1, the mapping probe P can collect reliable mapping data while stably moving through the object pipeline 1.

SUMMARY OF THE INVENTION

The system and method of putting and taking a mapping probe into and out of a pipeline of the related art can move a mapping probe through a pipeline, but how the mapping probe can collect position data in real time and can obtain position information of a pipeline using the collected data is not described in detail. Accordingly, the present invention has been made keeping in mind the above problems occurring in the related art, and the present invention is intended to propose a method in which a mapping probe collects and keeps its position information and estimates position information of a pipeline using the collected and kept position information while moving through the pipeline.

A flowchart illustrating a method of tracing a position in a pipeline using a mapping probe of the present invention is provided. In order to achieve the above object, according to one aspect of the present invention, there is provided a method of tracing a position of a pipeline by selecting and keeping in real time real-time position information of a mapping probe moving through the pipeline to find a position of the pipeline. The method includes: inserting the mapping probe into a tap water pipeline or a sewer pipeline and moving the mapping probe through the pipeline; receiving acceleration information and angular information in real time from acceleration sensors and gyro sensors on the basis of an origin (a start point in the pipeline) that is an initial value while the mapping probe moves through the pipeline and keeping the information in a memory by means of a controller on the mapping probe; estimating Euler angle (roll and pitch) on the basis of the acceleration information created by the acceleration sensors and information of acceleration of gravity by means of the controller; estimating Euler angle (roll, pitch, and yaw) on the basis of the angular information created by the gyro sensors by means of the controller; estimating a system modeling on the basis of the Euler angle information and a Kalman filter by means of the controller; applying covariance of system noise and covariance of measured noise to determine a ratio of the system noise and the measured noise in a system model by means of the controller; estimating three-dimensional position information modeling on the basis of the system modeling, the covariance of the system noise, and the covariance of the measured noise by means of the controller; receiving movement distance information of the mapping probe from an encoder in the mapping probe and keeping the movement distance information in a memory by means of the controller; estimating in real time three-dimensional position information of the mapping probe on the basis of a three-dimensional position information model, covariance, and real-time movement distance information of the mapping probe and keeping the three-dimensional position information in the memory by means of the controller; receiving the accumulated real-time three-dimensional position information of the mapping probe kept in the memory by means of a server; mapping the real-time three-dimensional position information of the mapping probe to geographic information by means of the server keeping the geographic information.

DETAILED DESCRIPTION OF THE INVENTION

A method of tracing the position of a pipeline using a mapping probe of the present invention having the objects described above is described with reference to FIGS. 3 to 9.

Figure 1:
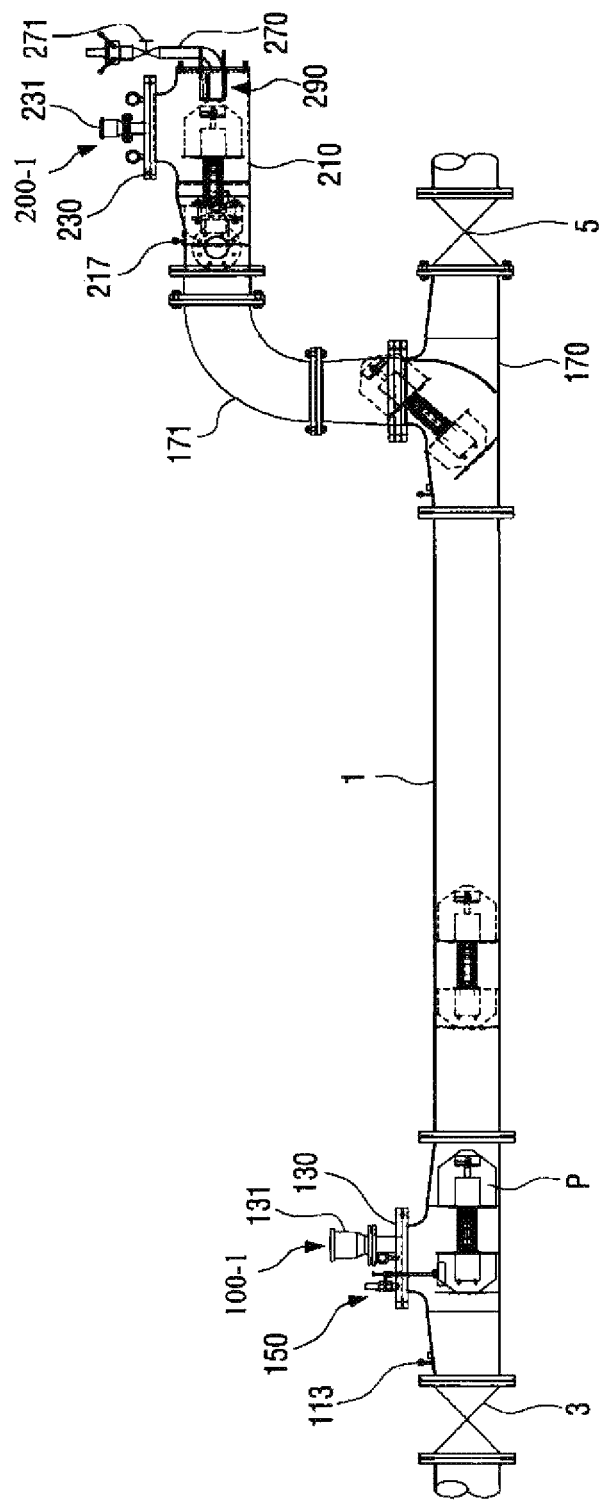
FIG. 1 is a diagram illustrating a system for putting and taking a mapping probe into and out of a pipeline of the related art.
Figure 2:
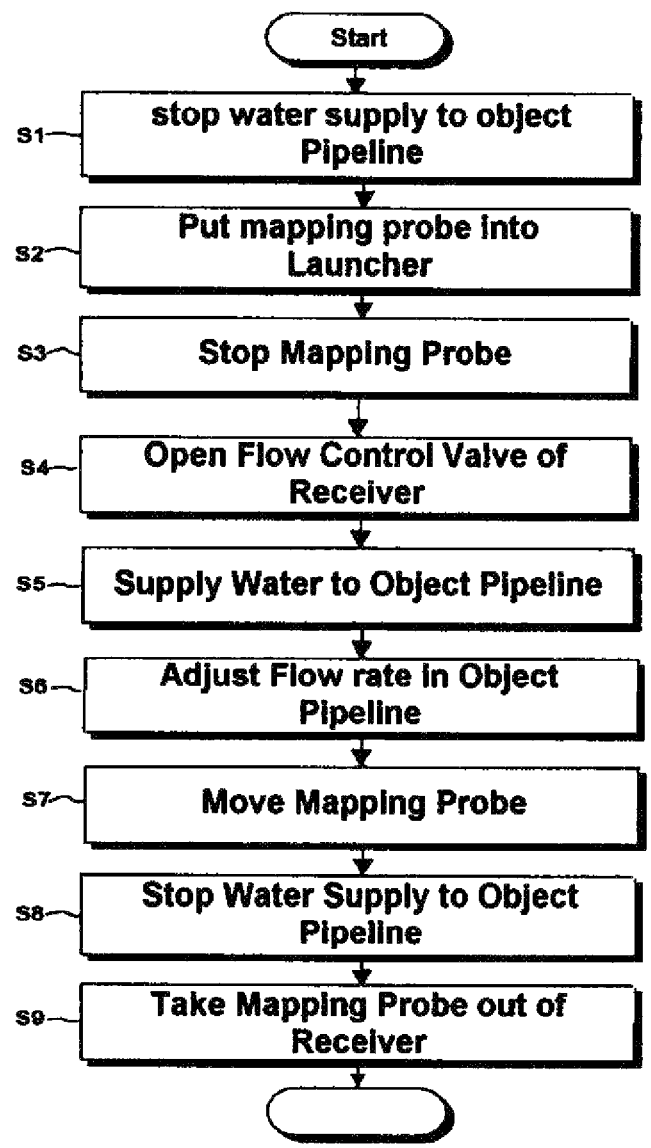
FIG. 2 is a flowchart illustrating a process of moving a mapping probe through a pipeline.
Figure 3:
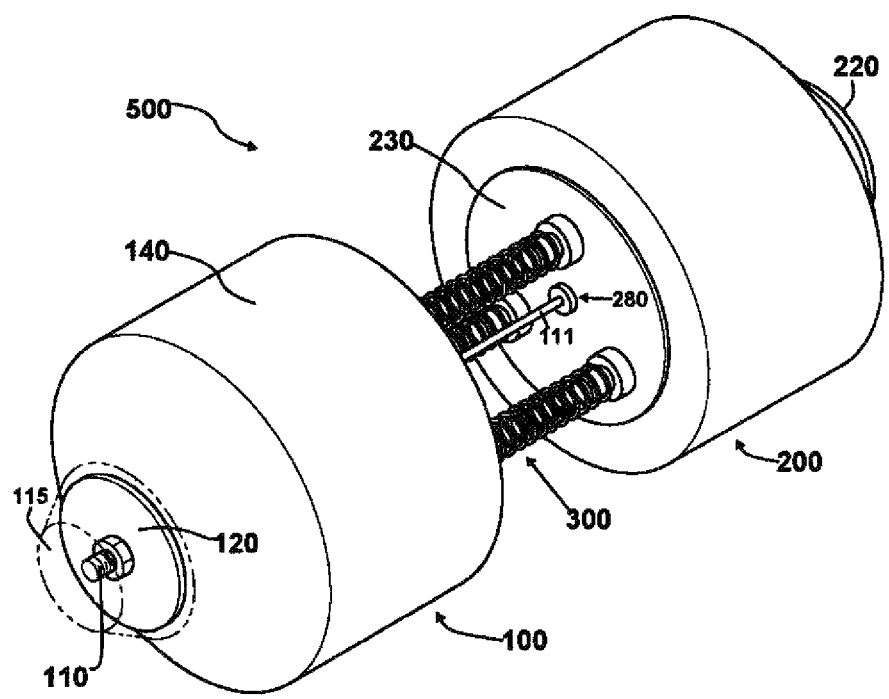
FIG. 3 is a perspective view of a mapping probe to be applied to the present invention.

FIG. 3 is a perspective view of a mapping probe for finding a position of a pipeline the present invention. Referring to FIG. 3, a mapping probe 500 for finding a position of a pipeline of the present invention includes: a first disc 120 that is fitted and fastened on a shaft member 110 thread-fastened to the inner side of a connection shaft at a first side of an internal body 140-1 of a first pig 100; a cap 115 coupled to a side of the shaft member 110 outside the first disc; a first pig 100 coupled to the shaft member; elastic members 300 that are composed of three flexible springs coupled to a second side of an external body 140 of the first pig; a cable 111 that electrically connects a battery, a sensor unit, and a control board of the first pig 110 and an encoder of a second pig, is connected with the battery through a first cable socket coupled to the external body of the first pig, and is connected to an encoder 260 through a second cable socket 280 disposed at the center of the second plate coupled to a first side of the second pig 200 and through an encoder socket 264 on the top of the encoder disposed in an internal body 240-1 of the second pig; the second pig 200 that is coupled to second sides of the elastic members at the first side of the second pig 200 and coupled to a second plate 230, which is coupled to the second cable socket 280 at the center, at the first side; and a second disc 220 that is disposed on a second side of the external body 240 of the second pig.

Figure 4:
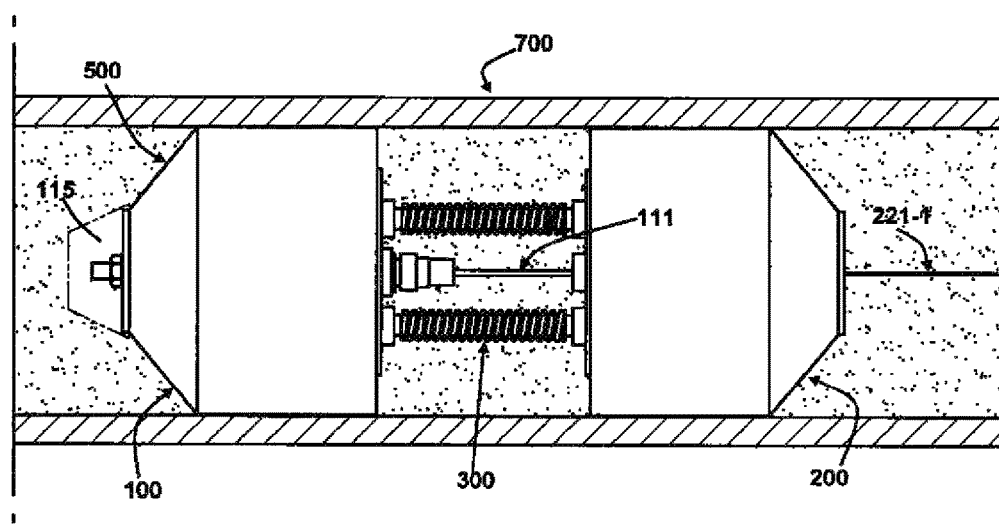
FIG. 4 is a view showing the mapping probe to be applied to the present invention in a pipeline.

FIG. 4 shows the configuration of the mapping probe for finding a position of a pipeline of the present invention in a pipeline. Referring to FIG. 4, according to the mapping probe 500 for finding a position of a pipeline of the present invention, when water pressure is applied in a pipeline 700, a steel wire wound on a reel in the internal body of the second pig 200 is released from the reel and the mapping probe can be moved forward by stream of the water. As described above, the mapping probe 500 for finding a position of a pipeline of the present invention creates acceleration information and angular speed information along three-dimensional axes of the mapping probe in real time through a sensor unit (composed of three acceleration sensors and three gyro sensors) while being moved by the water pressure through the pipeline 700 under the ground and keeps the information in a memory. Further, the mapping probe creates movement distance information from a movement start point (origin) through the encoder 260 and keeps the information in the memory. Accordingly, it is possible to find the information about the actual position of the pipeline on a map by mapping the information kept in the memory to geographic information in a server.

Figure 5:
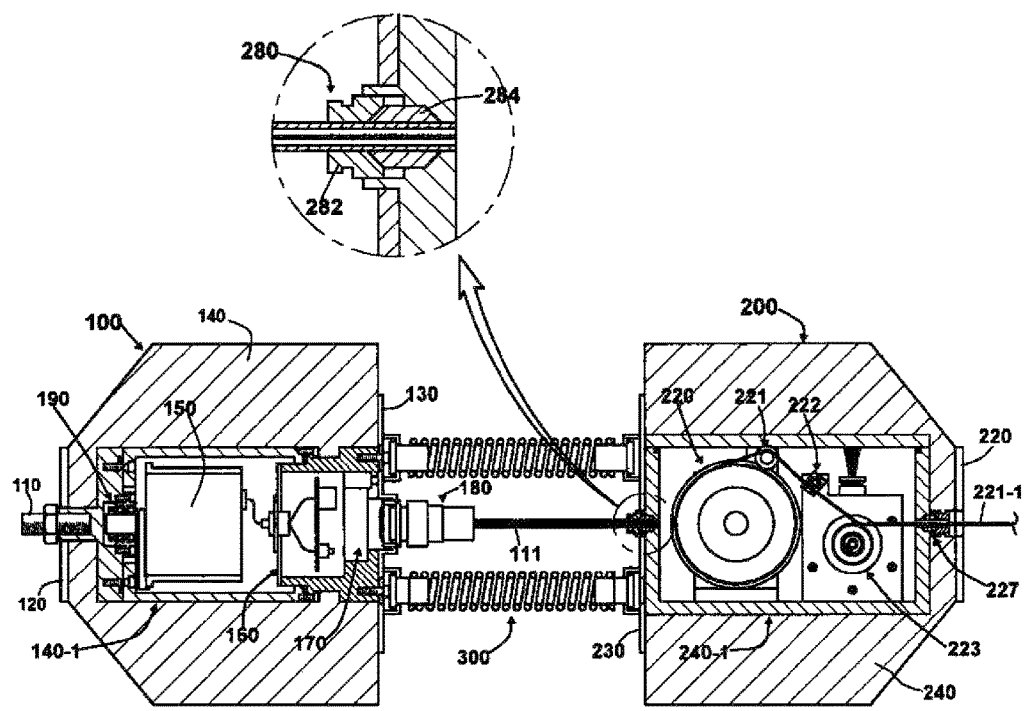
FIG. 5 is a cross-sectional view of the mapping probe to be applied to the present invention.

FIG. 5 is a cross-sectional view of the mapping probe for finding a position of a pipeline the present invention. Referring to FIG. 5, the mapping probe 500 for finding a position of a pipeline includes: a sensor unit 150 that has three acceleration sensors and three gyro sensors, is coupled to a first side of a internal body 140-1 by a coupling 190, has an auto-balancing on the front 155 to keep balance even if the mapping probe inclines left or right; a control board 160 that receives and keeps acceleration information of three-dimensional axes created by the three acceleration sensors in a memory and receive and keeps angular speed information of the three-dimensional axes created by the three gyro sensors in the memory, includes a controller receiving and keeping movement distance information from an encoder 260 of a second pig 200 in the memory, and is coupled to a second side of the internal body 140-1; a first pig 100 that is composed of the sensor unit, a battery coupled to the control board to supply power to the control board and the encoder, an external body 140 surrounding the internal body and the battery, a first disc 120 fitted on a connection, shaft coupled to the internal body 140-1 on a first side of the external body, a shaft, member 110 thread-fastened to the inner side of the connection shaft, and a first plate 130 coupled to a second side of the external body 140 and having a first cable socket 180 through which a cable is disposed; a cable 111 that supplies power from the battery to the acceleration sensors, the gyro sensors, the control board, and the encoder and transmits the information created by the acceleration sensors, the gyro sensors, and the encoder to the control board 160; elastic members 300 that are springs connecting the first pig 100 and a second pig 200 to each other; and the second pig having a second plate 230, which, has a second cable socket 280 on second sides of the elastic members, on a first side, and including therein a reel 220 that winds/releases a steel wire 221-1, a tension adjuster 224 that adjusts rotation of the reel, a first guide 221 that is disposed on the reel and guides the steel wire released, a guide hole 222 that guides the steel wire released from the first guide to the center, a second guide 223 that guides the steel wire released from the guide hole to a steel wire socket 227, an encoder socket 264 through which the cable 111 is inserted for connection with the encoder, an internal body 240-1 of the second pig that accommodates an encoder 260 calculating a movement distance of the mapping probe in a pipeline on the basis of the length of the steel wire 221-1 released from the reel 220 and transmitting information of the movement distance to the control board 160 through a cable, an external body 240 that is disposed outside the internal body 240-1, and a second disc 220 that is coupled to a second side of the external body 240. According to the mapping probe 500 of the present invention, when the steel wire is fixed to the launcher at the origin of a pipeline, the mapping probe is inserted into the pipeline, and then water pressure is applied to the pipeline, the mapping probe moves through the pipeline. Further, while the mapping probe moves through the pipeline, acceleration information of three-dimensional axes, angular speed information of the three-dimensional axes, and movement information of the mapping probe are created and kept in a memory. The sensor unit of the mapping probe for finding a position of a pipeline to be applied to the present invention is described in detail. The mapping probe includes: the sensor unit 150 that is composed of three acceleration sensors creating acceleration information about three-dimensional axes (S, y, z) and three gyro sensors creating, angular speed information of three-dimensional rotation axes (x, y, z) and that is coupled to the inner body by a bearing; and the control board 160 that receives the acceleration information of the three-dimensional axes and the angular speed information of the three-dimensional axes created by the sensor unit and the movement distance information of the mapping probe created by the encoder 260 of the second pig 200, keeps the information in the memory, and is coupled to the second side of the internal body of the first pig 100. In the second cable socket 280, a urethane pad 284 having the shape of a top at a side and a hole therein is inserted in an inclined groove 283 of a pad support member 282, which is disposed at the centers of the second plate 230 and the first side of the internal body 240-1 and has a hole and the inclined groove at its center, and a cable is disposed through the holes of the pad support member and the urethane pad 284, so the second cable socket 280 has a structure suitable for waterproofing. The steel wire socket 227 may have a waterproof structure similar to the second cable socket.

Figure 6:
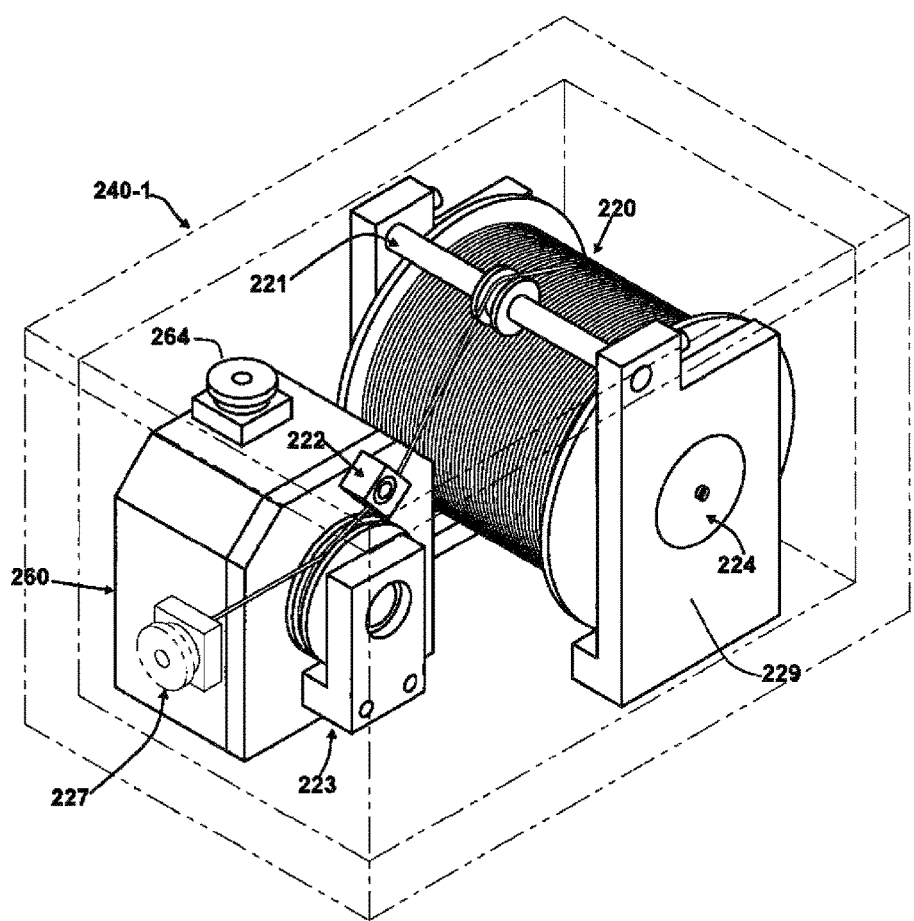
FIG. 6 is a perspective view of an internal body of a second pig to be applied to the present invention.

FIG. 6 is a perspective view showing the inside of the internal body of the second pig to be applied to the present invention. Referring to FIG. 6, the internal body 240-1 of the second pig 200 applied to the present invention accommodates: the reel 220 that is rotatably disposed between two supports fixed to the bottom of the internal body 240-1 and winds/releases the steel wire 221-1; the tension adjuster 224 that is disposed on one of the supports 229 for the reel; the first guide 221 that is disposed over the reel 220 and guides the steel wire; the guide hole 222 that guides the steel wire from the first guide 221 to the center of the second guide; and the encoder 260 to which the guide hole 222, the second guide 223, and the steel wire socket 227 are coupled and that has the encoder socket 264 in which a cable is inserted. Further, the external body 240 accommodates the internal body 240-1, the steel socket 227 is disposed at the second sides of the internal body 240-1 and the external body 240 in a waterproof structure and guides the steel wire guided by the second guide 223 to the outside of the second pig 200, and the second disc 220 is coupled to the second side of the external body with the steel wire socket 227.

Figure 7:
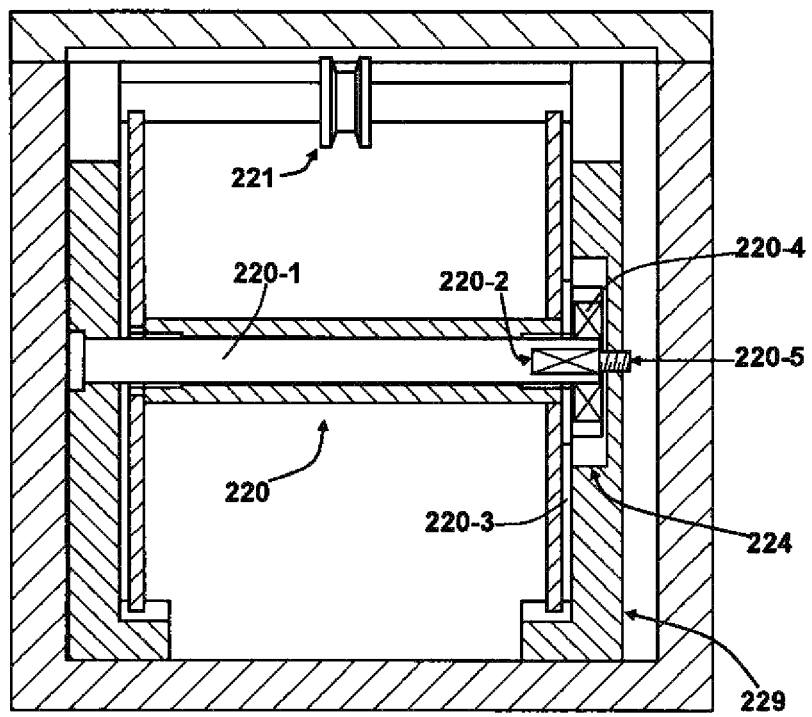
FIG. 7 is a view showing a tension adjuster to be applied to the mapping probe of the invention.

FIG. 7 is a cross-sectional view of the tension adjuster of the reel applied to the present invention. Referring to FIG. 7, the tension adjuster 224 of the reel to be applied to the present invention has: a thread portion 220-2 formed at a first end of a central shaft 220-1 of the reel, at a first side of the reel; an urethane pad 220-3 for tension adjustment coupled to the thread portion; a bearing 220-4 fitted on the urethane pad for tension adjustment and an adjusting bolt 220-5 inserted in the thread portion, rotated by the bearing, and adjusting torque of the reel by adjusting force applied to the urethane pad for tension adjustment. According to the tension adjuster 224, when the adjusting bolt is turned clockwise or counterclockwise, the urethane pad 220-3 for tension adjustment adjusts the force applied to the reel, so the torque of the reel is adjusted and accordingly tension in the steel wire 221-1 can be adjusted. As described above, the angular speed of the reel is adjusted by adjusting the adjusting bolt and the releasing speed of the steel wire can be adjusted by adjusting the angular speed of the reel, so idle-releasing and tangling of the steel wire can be prevented.

Figure 8:
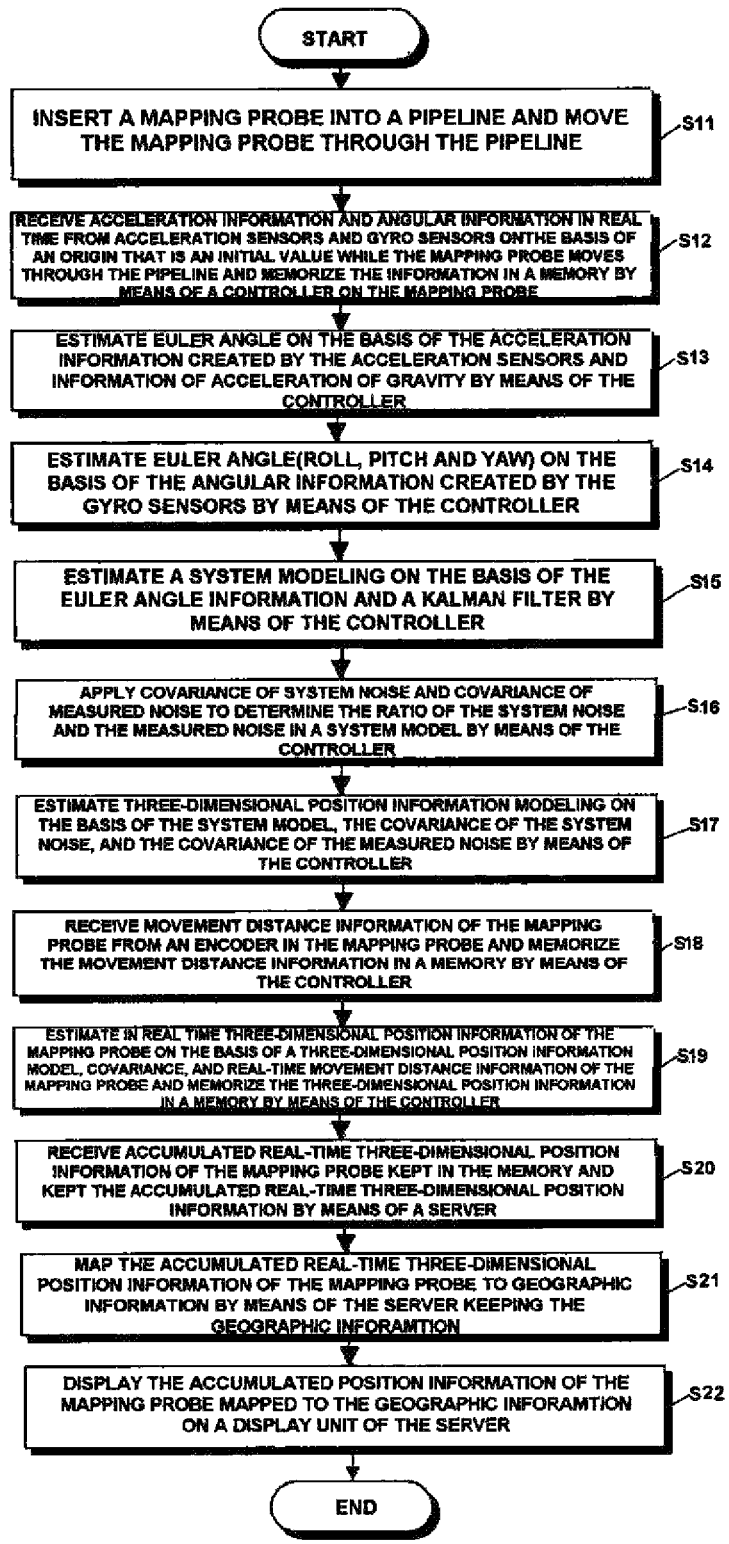
FIG. 8 is a flowchart illustrating control of a method of tracing the position of a pipeline using a mapping probe of the present invention.

FIG. 8 is a flowchart illustrating a method of tracing a position of a pipeline using a mapping probe of the present invention. Referring to FIG. 8, the method of tracing a position of a pipeline using a mapping probe of the present invention includes: inserting the mapping probe into a tap water pipeline or a sewer pipeline and moving the mapping probe through the pipeline (S11); receiving acceleration information and angular information in real time from acceleration sensors and gyro sensors on the basis of an origin (a start point in the pipeline) that is an initial value while the mapping probe moves through the pipeline and keeping the information in a memory by means of a controller on the mapping probe (S12); estimating Euler angle (roll and pitch) on the basis of the acceleration information created by the acceleration sensors and information of acceleration of gravity by means of the controller (S13); estimating Euler angle (roll, pitch, and yaw) on the basis of the angular information created by the gyro sensors by means of the controller (S14); estimating a system modeling on the basis of the Euler angle information and a Kalman filter by means of the controller (S15); estimating and applying covariance of system noise and covariance of measured noise to determine the ratio of the system noise and the measured noise in a system model by means of the controller (S16); estimating three-dimensional position information modeling on the basis of the system model, the covariance of the system noise, and the covariance of the measured noise by means of the controller (S17); receiving movement distance information of the mapping probe from an encoder in the mapping probe and keeping the movement distance information in a memory by means of the controller (S18); estimating in real time three-dimensional position information of the mapping probe on the basis of a three-dimensional position information model, covariance, and real-time movement distance information of the mapping probe and keeping the three-dimensional position information in the memory by means of the controller (S19); receiving accumulated real-time three-dimensional position information of the mapping probe kept in the memory and keeping the accumulated real-time three-dimensional position information by means of a server (S20); mapping the accumulated real-time three-dimensional position information of the mapping probe to geographic information by means of the server keeping the geographic information (S21); and displaying the accumulated position information of the mapping probe mapped to the geographic information on a display unit of the server (S22). The estimating of Euler angle (roll and pitch) on the basis of the acceleration information and information of acceleration of gravity by means of the controller (S13) is achieved by three acceleration sensors and estimation of Euler angle (roll and pitch) on the basis of three-axial acceleration information created by the three acceleration sensors is as the following Description 1;

[Description 1]

The acceleration measured by the three-axial acceleration sensors includes acceleration of gravity and various accelerations by acceleration of the sensors and expressed as following Equation 1, $$a = \dot{v} + v \times \omega + gR^T \quad (\because R^T = R^{-1}) \quad \text{[Equation 1]}$$

$$= \begin{bmatrix} \dot{v}_x \\ \dot{v}_y \\ \dot{v}_z \end{bmatrix} + \begin{bmatrix} 0 & v_z & -v_y \\ -v_z & 0 & v_x \\ v_y & -v_x & 0 \end{bmatrix} \begin{bmatrix} \omega_x \\ \omega_y \\ \omega_z \end{bmatrix} + g \begin{bmatrix} -\sin\theta \\ \cos\theta\sin\phi \\ \cos\theta\cos\phi \end{bmatrix}$$

where v is a linear speed, ω is an angular speed, and g is acceleration of gravity.

When v is zero and ω is zero in Equation 1, Euler angle is calculated as follows, $$\tan\phi_a = \frac{-a_y}{-a_z}, \sin\theta_a = \frac{-a_x}{g_x},$$

$$\phi_a = \operatorname{atan} 2(-a_y, -a_z), \theta_a = \operatorname{asin}\left(\frac{-a_x}{g_x}\right),$$

where $a = [a_x, a_y, a_z]^T$.

The estimating Euler angle (roll, pitch, and yaw) on the basis of the angular speed information by means of the controller (S14) is achieved by three gyro sensors and estimation of rotational speeds of Euler angle (roll, pitch, and yaw), that is estimation of angular speeds of the gyro sensors on the basis of the three-axial angular speed information created by the three gyro sensors can be achieved as in the following Equation 2, $$\begin{bmatrix} \omega_x \\ \omega_y \\ \omega_z \end{bmatrix} = C \begin{bmatrix} \dot{\phi} \\ \dot{\theta} \\ \dot{\psi} \end{bmatrix}, C = \begin{bmatrix} 1 & 0 & -\sin\theta \\ 0 & \cos\phi & \sin\phi\cos\theta \\ 0 & -\sin\phi & \cos\phi\cos\theta \end{bmatrix} \quad \text{[Equation 2]}$$

$$\begin{bmatrix} \dot{\phi} \\ \dot{\theta} \\ \dot{\psi} \end{bmatrix} = C^{-1} \begin{bmatrix} \omega_x \\ \omega_y \\ \omega_z \end{bmatrix}, C^{-1} = \begin{bmatrix} 1 & \sin\phi\tan\theta & \cos\phi\tan\theta \\ 0 & \cos\phi & -\sin\phi \\ 0 & \sin\phi/\cos\theta & \cos\phi/\cos\theta \end{bmatrix}$$

where $$\omega = (\omega_x, \omega_y, \omega_z)^T$$

Further, Euler angle (roll, pitch, and yaw) for the angular speeds of the gym sensors is (F, θ, ψ) and differential of the Euler angle is differential of the three-axial angular speeds, so the three-axial angular speed information can be achieved.

Further, the estimating of system modeling on the basis of Euler angle information and a Kalman filter by means of the controller (S15) uses Euler angle (F, θ, ψ) as state variables, and a system model estimated on the basis of measured values and differential of the state variables is expressed as in Equation 3, $$\begin{Bmatrix} \phi' \\ \theta' \\ \varphi' \end{Bmatrix} = \begin{bmatrix} 1 & \sin\phi\tan\theta & \cos\phi\tan\theta \\ 0 & \cos\phi & -\sin\phi \\ 0 & \sin\phi\sec\theta & \cos\phi\sec\theta \end{bmatrix} \begin{Bmatrix} p \\ q \\ r \end{Bmatrix} + w, \quad \text{[Equation 3]}$$

$$Z = \begin{bmatrix} 1 & 0 & 0 \\ 0 & 1 & 0 \end{bmatrix} \begin{Bmatrix} \phi \\ \theta \\ \varphi \end{Bmatrix} + V$$

to where p, q, r are angular speeds measured by the gym sensors, w is system noise, z is a measured value, and v is measured noise.

Further, experimental values of covariance Q of noise of the system model and covariance R of measured noise are as in the following Equation 4.

$$Q = \begin{Bmatrix} 0.0001 & 0 & 0 \\ 0 & 0.0001 & 0 \\ 0 & 0 & 1 \end{Bmatrix}, R = \begin{Bmatrix} 1 & 0 \\ 0 & 2 \end{Bmatrix} \quad \text{[Equation 4]}$$

Accordingly, the estimating of three-dimensional position information of the mapping probe in real time on the basis of the system modeling, covariance, and real-time movement information of the mapping probe can be achieved by the following Equation 5, $$\begin{Bmatrix} x_k \\ y_k \\ z_k \end{Bmatrix} = \begin{bmatrix} \sin\varphi \cdot \cos\theta \cdot \cos\phi \\ \cos\varphi \cdot \cos\theta \cdot \cos\phi \\ \sin\theta \cdot \cos\phi \end{bmatrix} \cdot u' + \begin{Bmatrix} x_{k-1} \\ y_{k-1} \\ z_{k-1} \end{Bmatrix} \quad \text{[Equation 5]}$$

where $u' = enc_k - enc_{k-1}$.

In Equation 5, for example, $x_{K-1}$ is a sample value of a step right before $x_K$ and $x_K$ is the current sample value, and the posture (roll, pitch, and yaw) of the sensors of the mapping probe is transformed into the three-dimensional movement distances (x, y, and z).

Figure 9:
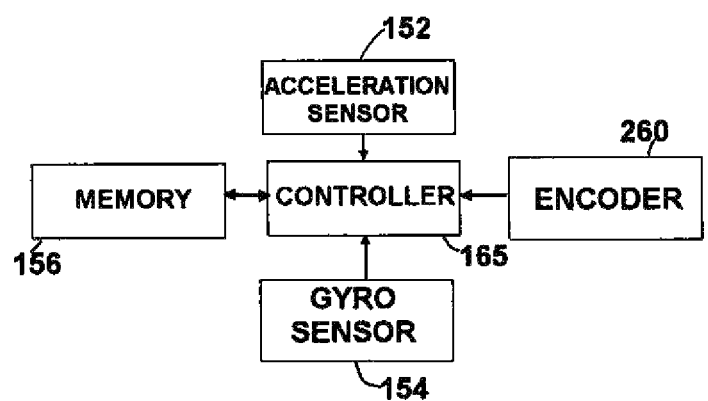
FIG. 9 is a view showing a controller to be applied to the present invention.

$enc_k$: current sample value received by encoder $enc_{k-1}$: sample value right before current sample value received by encoder $enc_{k2}$: value the same as two-step prior sample value from current sample received by encoder FIG. 9 is a view showing a controller to be applied to the present invention. The controller 165 applied to the present invention receives and keeps three-axial acceleration information from the three acceleration sensors 152, angular speed information from the three gyro sensors 154, and movement distance information from the encoder 260 in the memory 156, estimates Euler angle on the basis of the three-axial angular speed information and the three-axial acceleration information kept in the memory, performs system modeling on the basis of the Euler angle and a Kalman filter kept in the memory, estimates covariance of system noise and measured noise in the system model, estimates three-dimensional position information modeling for the system on the basis of the system model and the covariance, and estimates and keeps in real time three-dimensional position information of the mapping probe in the memory on the basis of the three-dimensional position information modeling, covariance, and movement distance information received from the encoder.

According to the method of tracing a position of a pipeline using a mapping probe of the present invention, it is possible to accurately find on a map a position of an underground pipeline. Further, according to the present invention, it is possible to accurately find position information on a pipeline map regardless of the depth or kind of facilities under the ground.

It will be apparent to those skilled in the art that various modifications can be made to the above-described exemplary embodiments of the present invention without departing from the spirit or scope of the invention. Thus, the preferred embodiments described above are exemplary in all aspects in different forms and should not be construed as limited to the embodiments set forth herein. The essential technical scope of the present invention is disclosed in the appended claims, and it is intended that the present invention cover all such modifications provided within the scope of the claims and their equivalents.

What is claimed is:

1. A method of tracing a position of a pipeline by collecting and keeping real-time position information of a mapping probe moving through the pipeline and including a controller, a sensor unit having acceleration sensors and gyro sensors, a memory, and an encoder, the method being implemented by a processor executing instructions stored in a non-transitory computer-readable medium and comprising:

inserting the mapping probe into the pipeline and moving the mapping probe through the pipeline;

receiving, by the controller installed on the mapping probe, acceleration information and angular speed information in real time from the acceleration sensors and the gyro sensors and keeping the acceleration and angular speed information in the memory, while moving the controller installed on the mapping probe through the pipeline when a start point in the pipeline is set as an initial value;

estimating, by the controller, Euler angle (roll and pitch) using the acceleration information and information on acceleration of gravity obtained from the acceleration sensors;

estimating, by the controller, Euler angle (roll, pitch, and yaw) using the angular information obtained from the gyro sensors;

estimating, by the controller, system modeling using the Euler angle (roll and pitch) and the Euler angle (roll, pitch, and yaw) and a Kalman filter;

estimating, by the controller, covariance of a system noise and covariance of a measured noise to determine a ratio of the system noise and the measured noise in a system, model;

estimating, by the controller, three-dimensional position information modeling using the system modeling, the covariance of the system noise, and the covariance of the measured noise;

receiving, by the controller, movement distance information of the mapping probe from the encoder installed on the mapping probe and keeping the movement distance information in the memory;

estimating, by the controller, in real time three-dimensional position information of the mapping probe using a three-dimensional position information model, the covariance of the system noise, the covariance of the measured noise, and the movement distance information of the mapping probe and keeping the three-dimensional position information in the memory;

receiving, by a server, the real-time three-dimensional position information of the mapping probe accumulated in the memory and keeping the real-time three-dimensional position information therein; and mapping, by the server, the real-time three-dimensional position information of the mapping probe to geographic information stored in the server.

2. The method of claim 1, wherein the estimating of Euler angle (roll and pitch) using the acceleration information and the information on acceleration of gravity obtained from the acceleration sensors is achieved by:

$$\tan\phi_a = \frac{-a_y}{-a_z}, \sin\theta_a = \frac{-a_x}{g_x},$$

$$\phi_a = \operatorname{atan} 2(-a_y, -a_z), \theta_a = \operatorname{asin}\left(\frac{-a_x}{g_x}\right).$$

3. The method of claim 1, wherein the estimating of Euler angle (roll, pitch, and yaw) using the acceleration information obtained from the gyro sensors is achieved by:

$$\begin{bmatrix}\dot\phi\\\dot\theta\\\dot\psi\end{bmatrix} = C^{-1}\begin{bmatrix}\omega_x\\\omega_y\\\omega_z\end{bmatrix}, C^{-1} = \begin{bmatrix}1 & \sin\phi\tan\theta & \cos\phi\tan\theta\\0 & \cos\phi & -\sin\phi\\0 & \sin\phi/\cos\theta & \cos\phi/\cos\theta\end{bmatrix}.$$

4. The method of claim 1, wherein the system model estimated using the Euler angle (roll and pitch) and the Euler angle (roll, pitch, and yaw) and the Kalman filter is:

$$\begin{Bmatrix}\phi'\\\theta'\\\varphi'\end{Bmatrix} = \begin{bmatrix}1 & \sin\phi\tan\theta & \cos\phi\tan\theta\\0 & \cos\phi & -\sin\phi\\0 & \sin\phi\sec\theta & \cos\phi\sec\theta\end{bmatrix}\begin{Bmatrix}p\\q\\r\end{Bmatrix} + w,$$

$$Z = \begin{bmatrix}1 & 0 & 0\\0 & 1 & 0\end{bmatrix}\begin{Bmatrix}\phi\\\theta\\\varphi\end{Bmatrix} + V.$$

5. The method of claim 1, wherein the covariance Q of noise of the system model and the covariance R of the measured noise are experimental values and are expressed as follows:

$$Q = \begin{Bmatrix}0.0001 & 0 & 0\\0 & 0.0001 & 0\\0 & 0 & 1\end{Bmatrix}, R = \begin{Bmatrix}1 & 0\\0 & 2\end{Bmatrix}.$$

6. The method of claim 1, wherein the three-dimensional position, information model is:

$$\begin{Bmatrix}x_k\\y_k\\z_k\end{Bmatrix} = \begin{bmatrix}\sin\varphi\cdot\cos\theta\cdot\cos\phi\\\cos\varphi\cdot\cos\theta\cdot\cos\phi\\\sin\theta\cdot\cos\phi\end{bmatrix}\cdot u' + \begin{Bmatrix}x_{k-1}\\y_{k-1}\\z_{k-1}\end{Bmatrix}.$$

7. The method of claim 1, further comprising displaying the accumulated three-dimensional position information of the mapping probe mapped to the geographic information on a display unit of the server.

8. A method of tracing a position of a pipe line by collecting and keeping real-time position information of a mapping probe moving through the pipeline and including a controller, a sensor unit having acceleration sensors and gyro sensors, a memory, and an encoder, the method being implemented by a processor executing instructions stored in a non-transitory computer-readable medium and comprising:

inserting the mapping probe into the pipeline and moving the, mapping probe through the pipeline;

receiving, by the controller installed on the mapping probe, acceleration information and angular speed information in real, time from the acceleration sensors and the gyro sensors and keeping the acceleration and angular speed information in the memory, while moving the controller installed on the mapping probe through the pipeline when a start point in the pipeline is set as an initial value;

estimating, by the controller, Euler angle (roll and pitch) using:

$$\tan\phi_a = \frac{-a_y}{-a_z}, \sin\theta_a = \frac{-a_x}{g_x},$$

$$\phi_a = \operatorname{atan} 2(-a_y, -a_z), \theta_a = \operatorname{asin}\left(\frac{-a_x}{g_x}\right),$$

from the acceleration information and information on acceleration of gravity obtained from the acceleration sensors;

estimating, by the controller, Euler angle (roll, pitch, and yaw) using:

$$\begin{bmatrix}\dot\phi\\\dot\theta\\\dot\psi\end{bmatrix} = C^{-1}\begin{bmatrix}\omega_x\\\omega_y\\\omega_z\end{bmatrix}, C^{-1} = \begin{bmatrix}1 & \sin\phi\tan\theta & \cos\phi\tan\theta\\0 & \cos\phi & -\sin\phi\\0 & \sin\phi/\cos\theta & \cos\phi/\cos\theta\end{bmatrix}$$

from the angular information obtained from the gyro sensors;

estimating, by the controller, a system modeling using the Euler angle (roll and pitch) and the Euler angle (roll, pitch, and yaw) and a Kalman filter;

estimating, by the controller, covariance of a system noise and covariance of a measured noise to determine a ratio of the system noise and the measured noise in a system model:

$$\begin{Bmatrix}\phi'\\\theta'\\\varphi'\end{Bmatrix} = \begin{bmatrix}1 & \sin\phi\tan\theta & \cos\phi\tan\theta\\0 & \cos\phi & -\sin\phi\\0 & \sin\phi\sec\theta & \cos\phi\sec\theta\end{bmatrix}\begin{Bmatrix}p\\q\\r\end{Bmatrix} + w,$$

$$Z = \begin{bmatrix}1 & 0 & 0\\0 & 1 & 0\end{bmatrix}\begin{Bmatrix}\phi\\\theta\\\varphi\end{Bmatrix} + V$$

estimating, by the controller, three-dimensional position information modeling using the system model, and the covariance Q of the system noise and the covariance R of the measured noise:

$$Q = \begin{Bmatrix}0.0001 & 0 & 0\\0 & 0.0001 & 0\\0 & 0 & 1\end{Bmatrix}, R = \begin{Bmatrix}1 & 0\\0 & 2\end{Bmatrix}$$

receiving, by the controller, movement distance information of the mapping probe from the encoder installed on the mapping probe and keeping the movement distance information in the memory;

estimating, by the controller, in real time three-dimensional position information of the mapping probe using a three-dimensional position information model:

$$\left\{\begin{matrix} x_k \\ y_k \\ z_k \end{matrix}\right\} = \begin{bmatrix} \sin\varphi \cdot \cos\theta \cdot \cos\phi \\ \cos\varphi \cdot \cos\theta \cdot \cos\phi \\ \sin\theta \cdot \cos\phi \end{bmatrix} \cdot u' + \left\{\begin{matrix} x_{k-1} \\ y_{k-1} \\ z_{k-1} \end{matrix}\right\},$$

the covariance of the system noise, the covariance of the measured noise, and the movement distance information of the mapping probe and keeping the three-dimensional position information in the memory;

receiving, by a server, the real-time three-dimensional position information of the mapping probe accumulated in the memory and keeping the real-time three-dimensional position information therein; and mapping, by the server, the real-time three-dimensional position information of the mapping probe to geographic information stored in the server.

* * * * *